United States Patent
Cai et al.

(10) Patent No.: US 11,074,133 B2
(45) Date of Patent: Jul. 27, 2021

(54) METHOD, ELECTRONIC DEVICE AND COMPUTER READABLE MEDIUM OF FILE MANAGEMENT

(71) Applicant: EMC IP Holding Company LLC, Hopkinton, MA (US)

(72) Inventors: Chaoqian Cai, Shanghai (CN); Tony Jiayue Dong, Hopkinton, MA (US); Crane Xiaohe Shi, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 86 days.

(21) Appl. No.: 16/288,051

(22) Filed: Feb. 27, 2019

(65) Prior Publication Data

US 2020/0133787 A1  Apr. 30, 2020

(30) Foreign Application Priority Data

Oct. 26, 2018  (CN) .......................... 201811261875.1

(51) Int. Cl.
*G06F 17/00* (2019.01)
*G06F 11/14* (2006.01)
*G06F 16/11* (2019.01)

(52) U.S. Cl.
CPC ........ *G06F 11/1451* (2013.01); *G06F 16/113* (2019.01); *G06F 2201/80* (2013.01); *G06F 2201/84* (2013.01)

(58) Field of Classification Search
None
See application file for complete search history.

(56) References Cited

U.S. PATENT DOCUMENTS

| | | | | | |
|---|---|---|---|---|---|
| 5,819,261 | A | * | 10/1998 | Takahashi | ............... G06F 16/40 |
| 7,257,689 | B1 | * | 8/2007 | Baird | .................. G06F 11/1471 |
| | | | | | 711/162 |
| 7,694,088 | B1 | * | 4/2010 | Bromley | ............. G06F 11/1458 |
| | | | | | 711/162 |
| 9,026,496 | B1 | * | 5/2015 | Bachu | ................... G06F 16/122 |
| | | | | | 707/645 |
| 9,158,804 | B1 | * | 10/2015 | Rangapuram | ....... G06F 11/1451 |
| 9,201,887 | B1 | * | 12/2015 | Earl | .................... G06F 11/1451 |

(Continued)

*Primary Examiner* — Hasanul Mobin
(74) *Attorney, Agent, or Firm* — Womble Bond Dickinson (US) LLP

(57) ABSTRACT

Embodiments of the present disclosure relate to method, electronic device and computer readable medium of file management. The method comprises: generating an index structure of files in first backup data created at a first point of time, the index structure at least indicating a file name and associated path information of each of the files, the first backup data being incremental backup data relative to second backup data created at a second point of time prior to the first point of time; determining, for a folder involved in the first backup data, existing files that have been present at the second point of time in the folder based on the second backup data; and identifying files modified between the first point of time and the second point of time in the folder by determining whether the index structure comprises index items of the existing files. Accordingly, the modified files can be quickly identified and the computation complexity can be reduced. Moreover, the processing can be efficiently executed for larger backup data.

15 Claims, 7 Drawing Sheets

(56) References Cited

U.S. PATENT DOCUMENTS

| | | | |
|---|---|---|---|
| 9,483,358 B1* | 11/2016 | Balasubramanian | ........................ G06F 11/1453 |
| 2005/0024513 A1* | 2/2005 | Hayashi | ................... G06F 16/51 348/333.01 |
| 2008/0243940 A1* | 10/2008 | Kato | .................... G06F 21/6218 |
| 2013/0173554 A1* | 7/2013 | Ubukata | ............. G06F 11/1448 707/640 |
| 2018/0011868 A1* | 1/2018 | Allen | .................... G06F 16/168 |
| 2018/0225177 A1* | 8/2018 | Bhagi | ..................... G06F 16/21 |

* cited by examiner

METHOD, ELECTRONIC DEVICE AND COMPUTER READABLE MEDIUM OF FILE MANAGEMENT

CROSS-REFERENCE TO RELATED APPLICATION

This patent application claims priority, under 35 U.S.C. § 119, of Chinese Patent Application No. 201811261875.1, filed Oct. 26, 2018, entitled "METHOD, ELECTRONIC DEVICE AND COMPUTER READABLE MEDIUM OF FILE MANAGEMENT."

FIELD

The present disclosure relates to the computer field, and more specifically, to a method, electronic device and computer readable medium of file management.

BACKGROUND

In order to guarantee data security, a data backup system is usually utilized to back up data for data recovery when necessary, e.g., recovering data lost due to disasters or rolling data back to an earlier state due to a possible error and the like. Besides this traditional usage, some other novel usages of backup data, e.g. data searching or data analysis etc., are also being sought. In this case, management for the backup data draws more and more attention.

It is required to understand evolution of each file in the backup data with times during the management for the backup data. For example, when the file is backed up for the first time; whether the file has been modified since that; the point of times of modifications; which new versions are generated after each modification and when the file is deleted or the file is not deleted yet and the like. In these cases, it is required to identify whether each file in the backup data is newly added, deleted or modified. Among processes, how to identify the modified files from the backup data of the files in an incremental backup, especially large-sized incremental backup, becomes a huge task.

SUMMARY

Embodiments of the present disclosure provide a solution for file management.

In accordance with a first aspect of the present disclosure, there is provided a method of file management. The method comprises: generating an index structure of files in first backup data created at a first point of time, the index structure at least indicating a file name and associated path information of each of the files, the first backup data being incremental backup data relative to second backup data created at a second point of time prior to the first point of time; determining, for a folder involved in the first backup data, existing files that have been present at the second point of time in the folder based on the second backup data; and identifying files modified between the first point of time and the second point of time in the folder by determining whether the index structure comprises index items of the existing files.

In accordance with a second aspect of the present disclosure, there is provided an electronic device. The electronic device comprises: at least one processor; a memory coupled to the at least one processor and having instructions stored thereon, the instructions, when executed by the at least one processor, causing the device to perform acts comprising: generating an index structure of files in first backup data created at a first point of time, the index structure at least indicating a file name and associated path information of each of the files, the first backup data being incremental backup data relative to second backup data created at a second point of time prior to the first point of time; determining, for a folder involved in the first backup data, existing files that have been present at the second point of time in the folder based on the second backup data; and identifying files modified between the first point of time and the second point of time in the folder by determining whether the index structure comprises index items of the existing files.

In accordance with a third aspect of the present disclosure, there is provided a computer-readable storage medium having computer-readable program instructions stored thereon which, when executed by a processing unit, cause the processing unit to perform the method according to the first aspect of the present disclosure.

It should be appreciated that the Summary is not intended to identify key or essential features of the embodiments of the present disclosure, or limit the scope of the present disclosure. Other features of the present disclosure will be understood more easily through the following description.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

Throughout the drawings, same or corresponding signs indicate same or corresponding parts.

DETAILED DESCRIPTION OF EMBODIMENTS

Embodiments of the present disclosure will be described in more details below with reference to the drawings. Although the drawings illustrate some embodiments of the present disclosure, it should be appreciated that the present disclosure can be implemented in various manners and should not be interpreted as being limited to the embodiments explained herein. On the contrary, the embodiments are provided to understand the present disclosure in a more thorough and complete way. It should be appreciated that drawings and embodiments of the present disclosure are provided only for the purpose of examples rather than restricting the protection scope of the present disclosure.

In description of the embodiments of the present disclosure, the term "includes" used herein and its variants are to be read as open-ended terms that mean "includes, but is not limited to." The term "based on" is to be read as "based at least in part on." The term "one embodiment" is to be read as "at least one embodiment." The following text also can include other explicit and implicit meanings.

Figure 1:
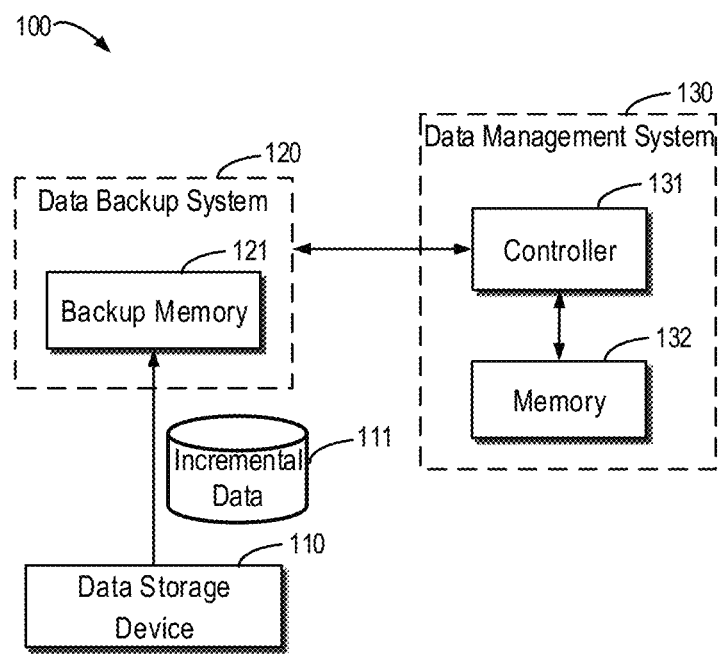
FIG. 1 illustrates a schematic diagram of an exemplary application scenario where embodiments of the present disclosure can be implemented.

FIG. 1 illustrates a schematic diagram 100 of an exemplary application scenario where embodiments of the present disclosure can be implemented. In order to guarantee security of data on a data storage device 110, the data on the data storage device 110 can be backed up via a storage backup system 120, for example to a backup memory 121. The data storage device 110 can be any local storage device or distributed storage device for data storage, e.g., Network Attached Storage (NAS) device and the like. The backup memory 121 can be a storage device for storing large volumes of data. The storage device can include various volatile and/or non-volatile data storage media, such as magnetic disks, optical disks, hard disks, solid-state disks (SSD) and cache etc.

The backup data on the backup memory 121 can be managed by a data management system 130 which can perform a variety of management operations on the backup data for the above mentioned data search, data analysis, data mining and the like. The data management system 130 can include a controller 131 and a memory 132.

As shown in FIG. 1, only incremental data 111 is backed up to the backup memory 121 during data backup, the incremental data 111 being a variation of the data since last backup. In the embodiments of the present disclosure, the data management system 130 is intended to manage backup data in the incremental backup, especially to identify modified files. It should be noted that although the data management system 130 and the data backup system 120 is separately illustrated in FIG. 1, the data management system 130 can be implemented on the data backup system 120. The present application is not restricted in this regard.

For the incremental data 111, the data backup system 120 usually can provide to the data management system 130 only metadata of newly added or modified items (files or folders) since last backup without metadata of deleted items. As a supplementary, the data backup system 120 usually can provide to the data management system 130 a list of folders which sub-files or sub-folders are modified since last backup and a list of file names recording current sub-files or sub-folders for every folder. An example procedure of identifying modified files under such circumstances is described below with reference to FIG. 2.

Figure 2:
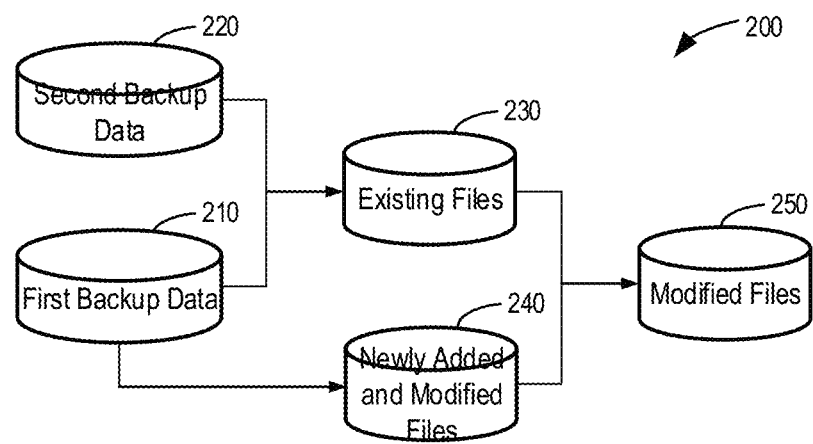
FIG. 2 illustrates a schematic diagram of a procedure for identifying modified files in accordance with embodiments of the present disclosure.

FIG. 2 illustrates a schematic diagram 200 of a procedure for identifying modified files in accordance with embodiments of the present disclosure. As shown in FIG. 2, first backup data 210 is incremental backup data relative to second backup data 220. For example, the first backup data 210 can be created at a first point of time while the second backup data 220 is created at a second point of time prior to the first point of time.

An existing file 230 at the second point of time can be identified by comparing the first backup data 210 with the second backup data 220. For example, unmodified files and modified files can be identified in accordance with an intersection of a list of file names of the same folder involved in the first backup data 210 and the second backup data 220. It should be clarified here that the folder in the first backup data 210 are modified or newly added. The folder may also contain unmodified files in addition to the modified or newly added files. Therefore, unmodified files and modified files, i.e., existing files 230 at the second point of time, can be acquired based on the intersection of the list of file names in the same folder.

Furthermore, newly added and modified files 240 can be identified from the first backup data 210. Then, modified files 250 in the first backup data 210 can be identified on the basis of an intersection of the newly added and modified files 240 and the existing files 230 consisting of unmodified and modified files, wherein the modified files 250 are files modified between the first point of time and the second point of time.

In the approach illustrated in FIG. 2, since the folder contents provided to the data management system 130 by the data backup system 120 only include file names, all of the above intersection operations are pure string based. In addition, the newly added and modified file 240 is also intended to provide a set of file names for fast lookup operations.

Some solutions attempt to avoid utilizing the set of file names of the newly added and modified file 240, but fail to succeed. For example, the method based on data comparison is unfeasible as the metadata information of the folder content cannot be acquired. For another example, direct comparison of corresponding items in the first backup data 210 and the second backup data 220 is also impracticable on account of low efficiency resulted from transmission and execution overheads.

In some further solutions, the set of file names of the newly added and modified file 240 can be implemented by: directly storing a full path name of every file, for example, into a hash table or a binary search tree (BST), to facilitate fast lookup required by the intersection operation. The full path name, for example, is Root Folder/Folder/Subfolder/File Name etc. The solution can be implemented through the following Pseudocode 1:

```
initialize set A, B and C
b = get current incremental backup from first backup data
for each file item f in b:
    insert full path name of f into C
for each file folder item d in b:
    A = get the file name set of d from second backup data
    B = get the file name set of d from first backup data
    append A∩B∩C to output as the modified items
```

Accordingly, the pseudocode-implemented solution requires two traverse iterations of the current incremental data: one for construction of file name set C and another one for target item extraction. These two traverse iterations are inevitable since the extraction procedure could not start until all file names in current incremental data have been found, especially when the iteration order of the file items is not specified. The two traverse iterations require double accesses to the data backup system 120 (each iteration of items in the backup data requires multiple accesses to the data backup system 120), which accordingly further impacts the data backup system 120 and network transmission.

Besides, since the file name set C stores all file names of the items in the current incremental data, its space complexity is associated with the file count in the current incremental data. As the incremental backup only records variations of data since the last backup, the variations do not contain too many items under most circumstances and this space complexity usually is not an issue. However, in some special cases, the space complexity cannot be satisfied. For example, when some large-sized incremental backup, each for example containing more than 10,000,000 file items, is processed concurrently, an out of memory (OOM) exception will occur shortly after the start of the processing. A simple math calculation can give an approximation of the expected memory consumption. Assuming each file name contains 50 characters and each character occupies 2 bytes, the storage of all file names merely in one single incremental backup will require a total memory of 1 GB excluding the extra storage overheads. This is a heavy burden for the system and will hurt the scalability of the system.

In view of this, the basic concept of the embodiments of the present disclosure is layered storage for the file name set C (also known as a file name cache). In one implementation of the concept, the path information (also referred to as position information or folder prefix) and the file name can be stored separately. The detailed description will be provided with reference to FIG. 3.

Figure 3:
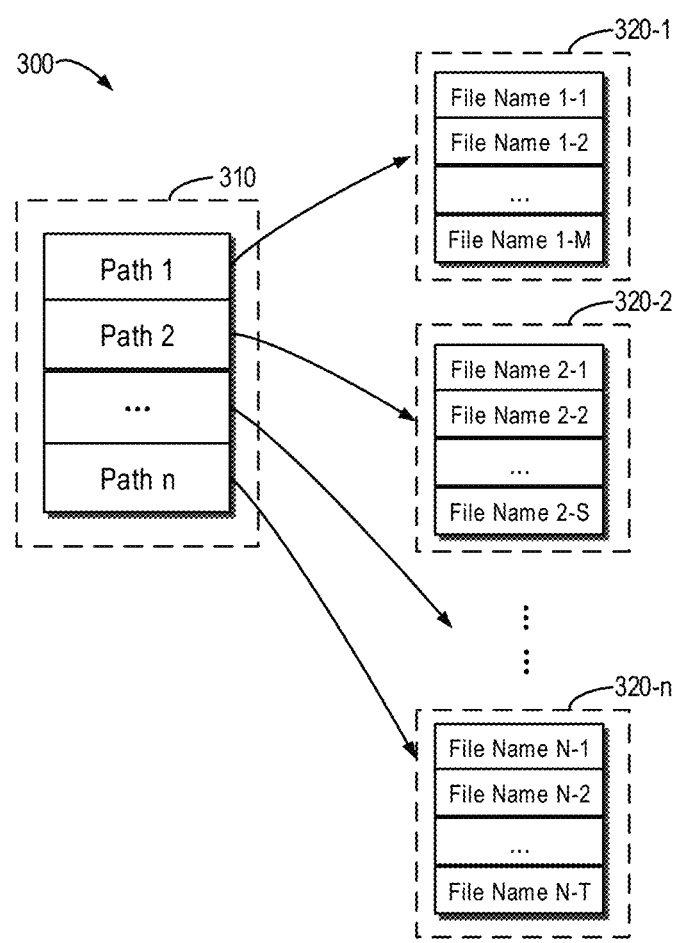
FIG. 3 illustrates a schematic diagram of an example index structure in accordance with embodiments of the present disclosure.

FIG. 3 illustrates a schematic diagram of an example index structure 300 in accordance with embodiments of the present disclosure. Aa shown in FIG. 3, a first layer stores path information 310 at respective different positions (folders), and a second layer stores actual file names organized through their positions. For example, the path 1 is associated with the file name set 320-1, the path 2 is associated with the file name set 320-2, and so on in a similar fashion. In accordance with embodiments of the present disclosure, the index structure 300 can be implemented by two layers of hash table cascaded together. The first-layer hash table is responsible for storing the path information and associating the path information with a second-layer hash table which stores all file names under this path. In alternative embodiments, the hash table employed in each layer can be replaced by a similar BST structure without causing any apparent influences on performance under most circumstances. It should be appreciated that the index structure 300 can be implemented through any suitable data structures, such as a hash table, a Trie tree (also known as prefix tree), a linked list, an array, a binary search tree etc., and any combinations thereof.

The inventors discover in study that the two-layered index structure 300 share the same concept with the Trie tree in some aspects. In fact, the Trie tree is also feasible here. In that case, this Trie tree can be viewed as a special case of making layers from full file name. That is, instead of only separating path part from file name part, every single character in the full file name is separated as an individual layer. These two data structures are conceptually quite similar in the aspect of attempting to reduce the space complexity. The two-layer index structure 300 is preferred since a typical implementation of Trie tree in practice generally gives a space complexity much larger than that of a hash table due to the dependence on the alphabet. Detailed explanations of space complexity will be provided later.

Based on the concept of layered storage of the present invention, embodiments of the present disclosure can fulfill a faster lookup in the traverse iteration of the incremental data and also can complete identification of the modified files by a single traverse iteration. Additionally, the above embodiments can lower the space complexity. Example implementations of file management based on the above concept in accordance with embodiments of the present disclosure are described below with reference to FIGS. 4 and 5.

Figure 4:
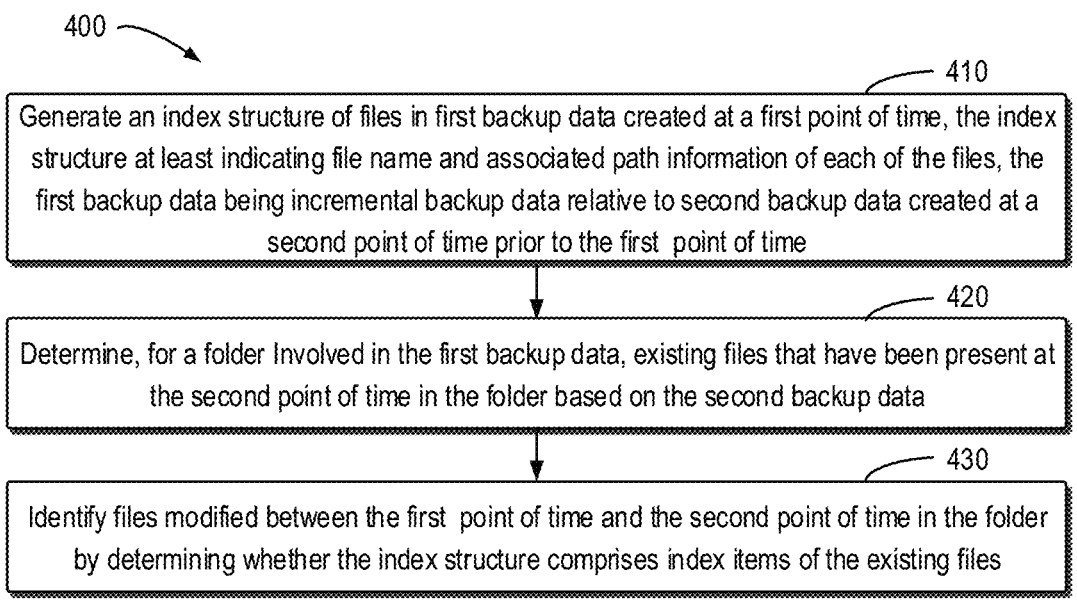
FIG. 4 illustrates a flowchart of a method for file management in accordance with one embodiment of the present disclosure

FIG. 4 illustrates a flowchart of a method 400 for file management in accordance with one embodiment of the present disclosure. The method 400 can be implemented on the data management system 130 (e.g., the controller 131) of FIG. 1.

As shown in FIG. 4, an index structure (such as the index structure 300 shown in FIG. 3) of files in the first backup data (e.g., the first backup data 210 in FIG. 2) created at the first point of time is generated at block 410. In accordance with embodiments of the present disclosure, the index structure at least indicates a file name of each of the files and path information associated with the file name. The first backup data is incremental backup data relative to the second backup data (e.g., the second backup data 220 in FIG. 2) created at the second point of time prior to the first point of time. It can be understood that the processing at the block 410 in fact corresponds to a procedure of acquiring the newly added and modified files 240 with reference to FIG. 2.

At block 420, for a folder involved in the first backup data 210, existing files (such as the existing files 230 in FIG. 2) that have been present at the second point of time in the folder can be determined based on the second backup data 220. It can be appreciated that the processing of the block 420 in fact corresponds to a procedure of acquiring the existing files 230 with reference to FIG. 2.

files (e.g., the existing files 230 in FIG. 2) modified between the first point of time and the second point of time in the folder are identified, at block 430, by determining whether the index structure 300 includes index items of the existing files 230. It can be understood that the processing of the block 430 in fact corresponds to a procedure of identifying the modified file 250 with reference to FIG. 2.

Accordingly, by means of the management of the index structure stored hierarchically, faster lookup in the traverse iteration of the incremental data can be realized and system efficiency can be enhanced.

The use of hierarchically stored index structure alone may be insufficient to lower the space complexity to an acceptable level. The logical organization of files and folders within a file system could be regarded as a tree structure: a tree with folders as internal nodes while files as leaf nodes, with a root node being represented as a root folder. An empty folder also can be a leaf node. Although the order in which the files and the folders are physically stored may be random depending on the implementations, the logical structure of the file system is relatively stable. Then, the iteration of files and folders can be equivalently described as a tree traversal. Assuming all files and folders can be traversed in a depth-first-search (DFS) manner in post order (this assumption can be satisfied in most cases; otherwise, an adapter is required to provide this guarantee), the content of the file name set can be dynamically maintained as a subset of the total files without breaking the correctness.

In this regard, embodiments of the present disclosure provide more detailed implementations of dynamically maintaining contents of the file name set (the newly added and modified files 240) in accordance with the iterations, thereby the space complexity can be further lowered while fast lookup is realized. The details are described below with reference to FIG. 5, which illustrates a flowchart of a method 500 for file management in accordance with a further embodiment of the present disclosure. The method 500 can be implemented on the data management system 130 (e.g., the controller 131) of FIG. 1.

Figure 5:
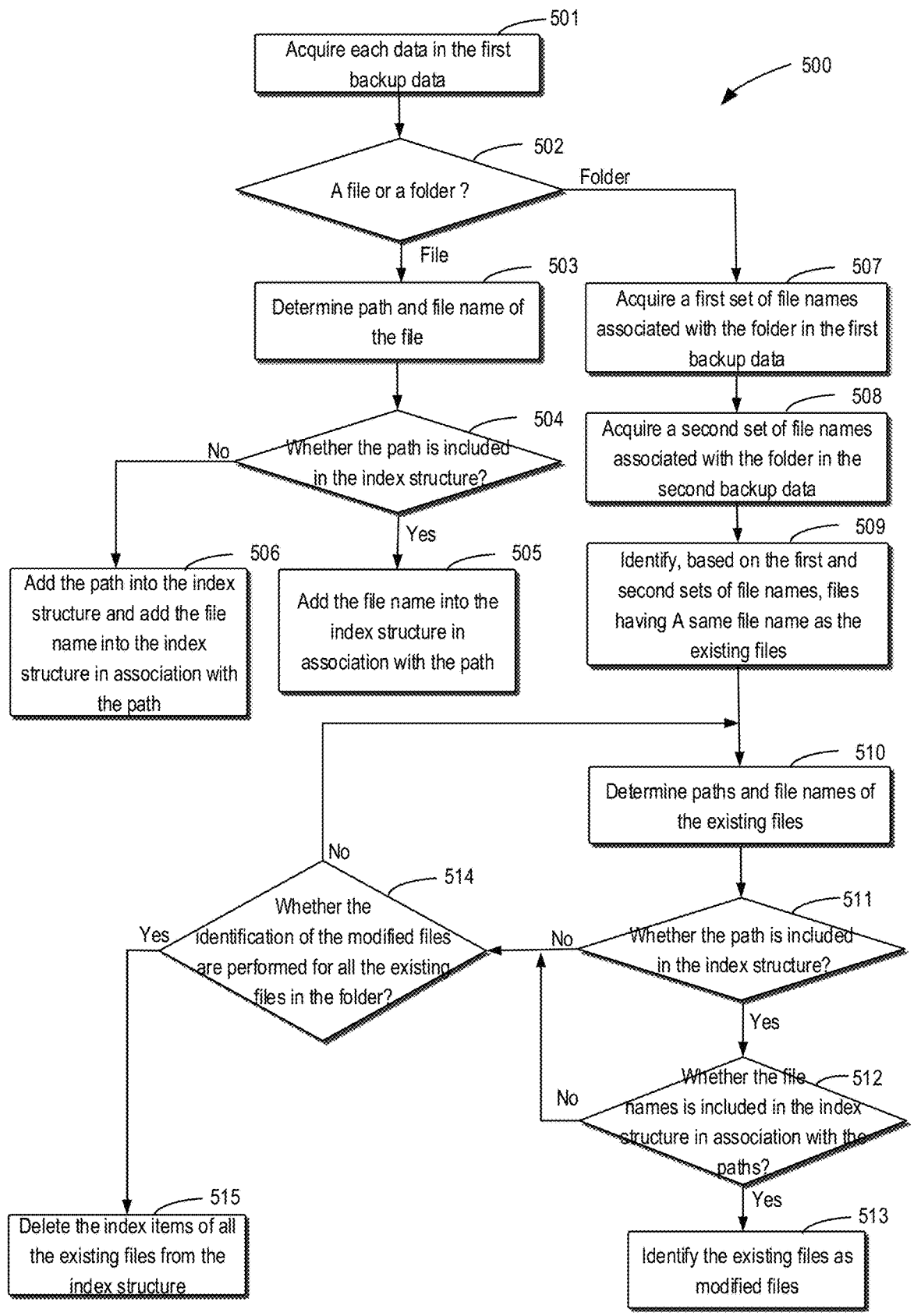
FIG. 5 illustrates a flowchart of a method for file management in accordance with a further embodiment of the present disclosure.

As shown in FIG. 5, each data in the first backup data 210 is acquired at block 501. As described above, the first backup data 210 is incremental data relative to the second backup data 220. The first backup data 210 includes files or folders among other items. It is certain that other information can also be included. However, the solution in accordance with the embodiment of the present disclosure does not relate to other information and it is unnecessary to go into details of such information to avoid confusing the present invention. In accordance with embodiments of the present disclosure, metadata corresponding to each data in the first backup data 210 can be acquired, the metadata including information describing such as the creation time, size, path, name, physical storage position and the like of the data.

It is determined at block 502 whether the data acquired at block 501 is a file item or a folder item. In accordance with embodiments of the present disclosure, the determination can be made based on the metadata. If the data is a file item, the method proceeds to block 503 to determine path and name of the file. In accordance with embodiments of the present disclosure, the path refers to position information of the file, e.g., a folder, a parent folder, etc. to which the file belongs.

It is determined at block 504 whether the path determined at block 503 is included in an index structure (such as the index structure 300 of FIG. 3). If the path is included in the index structure, for example, in the path information 310 (corresponding to path N), the method proceeds to block 505, at which the file name determined at block 503 is added, in association with the path, into the index structure, e.g., into the file name set 320-N corresponding to the path N.

If the path is excluded from the index structure, the method proceeds to block 506 to add the path into the index structure and add the file name into the index structure in association with the path. For example, the path is added into the path information 310 as path O. In addition, a file name set 320-0 associated with the path O is added and the file name determined at block 503 is inserted into the file name set 320-0. So far, the processing from blocks 501 to 506 can generate the index structure, which can be provided for implementing the operation of block 410 in FIG. 4.

If it is determined at block 502 that the current data item in the first backup data 210 is a folder item, the method 500 proceeds to block 507, at which a first set of file names associated with the folder are acquired from the first backup data 210. As mentioned above, the data backup system 120 can provide to the data management system 130 a list of newly added or modified folders and a list of sub-files or sub-folders of each folder. Accordingly, a first set of file names associated with the folder at the first point of time can be directly determined based on the first backup data 210 from the data backup system 120.

Subsequently, a second set of file names associated with the folder are acquired from the second backup data 220 at block 508. Similar to the acquisition of the first set of file names, the second set of file names associated with the folder at the second point of time can be directly determined from the second backup data 220. It should be appreciated that the operations of blocks 507 and 508 can be executed in any order and the present application is not restricted in this regard.

Existing files are identified at block 509 based on the first set of file names acquired at block 507 and the second set of file names acquired at block 508. In accordance with embodiments of the present disclosure, files having the same file name are identified as the existing files. So far, the processing from blocks 507 to 509 can perform the determination for the existing files, which can be provided for implementing the operation of block 420 in FIG. 4.

Path and file name are determined, at block 510, for each existing file identified in block 509. In accordance with embodiments of the present disclosure, the path of the existing file corresponds to path information of a folder item acquired at 501 (e.g., path prefix).

It is determined, at block 511, whether the path determined at block 510 is included in the index structure. In accordance with embodiments of the present disclosure, the path can be compared with the path information 310 in the index structure 300 one by one, so as to determine whether the path is included in the index structure 300. If it is determined, at block 511, that the path is included in the index structure, the method 500 proceeds to block 512, to determine whether the file name determined at block 510 is included in the index structure in association with the path. In accordance with embodiments of the present disclosure, the file name can be compared separately with every item in the file name set associated with the corresponding path in the path information 310, so as to determine whether file name has been included in the index structure 300.

If it is determined, at block 512, that the file name is included in the index structure in association with the path, the current existing file is identified as a modified file. If it is determined, at block 512, that the file name is excluded from the index structure, the method 500 proceeds to block 514, to determine whether the identification of the modified files has been performed for all the existing files in the folder. If it is determined, at block 514, that the identification is not executed for all the existing files, the method returns to 509 to perform the operations from blocks 510 to 514 for the next existing file until the identification of the modified files has been performed for all the existing files.

If it is determined, at block 514, that the identification of the modified files has been performed for all the existing files, the method 500 proceeds to block 515, at which index items of all the existing files are deleted from the index structure. In accordance with embodiments of the present disclosure, paths and file name set associated with the existing files can be deleted from the index structure. At this point, via the processing from blocks 510 to 515, the identification of the modified files is realized, which can be provided for implementing the operation of block 430 in FIG. 4.

In accordance with embodiments of the present disclosure, the procedure of FIG. 5 can be implemented, for example, via the following Pseudocode 2:

```
initialize set A and B
initialize hash table C (key: string, value: set of string)
b = get current incremental backup form first backup data
for each item i in b (DFS in post order):
    if i is a file item:
        I = get the location string of i
        if C has a key equals I:
            insert file name off into the set corresponding to key I
        else:
            x = create a new set containing file name of i
            insert x into C with key as I
    else if i is a file folder item:
        A = get file name set of i from second backup data
        8 = get file name set of i from first backup data
        for each item y in A∩8:
            y1 = get the location (folder prefix) part of y
```

-continued

```
  y2 = get the file name part of y
  if C has a key equals to y1 and y2 is in the
  corresponding set:
       append y to output as the modified item
  recycle C with key equals to full path name of i
```

So far, the method for file management in accordance with embodiments of the present disclosure has been described. According to this solution, in addition to constructing an index structure by adding new elements into the file name set, the occupied storage space can be shrunk during the iteration procedure, so as to reduce the space demand. During the operation of the solution, single traverse iteration alone can complete both construction of the index structure and identification of the modified file. Every time the processing of a folder is completed, all items belonging to this position are immediately deleted (or recycled) as they are no longer needed. Intuitively, such deleting process is valid since the post order iteration guarantees that a folder item is always accessed only after all of its child items have been accessed. Then, each time the processing of a folder item is completed, all of the corresponding child items are not needed any more, and can be removed safely. On the other hand, the layered storage structure can carry out the above batch deleting operation in a fast way because all items directly under the folder could be removed with a single operation. Therefore, the operational complexity of this method is greatly reduced.

The inventors verify the correctness of this solution. The correctness of the Pseudocode 1 solution is obvious since it is just a straightforward line-by-line implementation of the formal description of the problem. The Pseudocode 2 behaves identically with Pseudocode 1 in a way that the desired file list is outputted using a folder-by-folder comparison except that the file name cache is shrunk dynamically. The crucial part is then to prove the correctness of the dynamic file name cache, namely that the introduction of the dynamic file name cache should not affect the original correctness.

As a common practice, the loop invariant properties can be utilized to prove the correctness of an algorithm. For Pseudocode 2, the loop invariant can be established as: the file name cache always stores the items included only in the folder under current consideration (the folder for which the DFS iteration has been started), i.e., items contained in folders which have not been processed or have been processed will not appear in the cache. If this loop invariant property is satisfied, then the dynamic file name cache is equivalent to a static cache containing all file items in the backup (as the one in Pseudocode 1) since this file name cache is only accessed from folder processing/comparison. This loop invariant also can be expressed as: if it can be guaranteed that the file name cache has been contained the direct child items for this folder at the beginning of every folder processing/comparison, then the correctness of the folder processing/comparison can also be guaranteed. In order to give the overall correctness, the loop invariant property should be proved to be correct in the following three phases.

(1) Initialization. Before the item iteration starts, the file name cache is empty while no folder has been accessed. Therefore, the loop invariant is obviously satisfied.

(2) Maintenance. Suppose that the DFS iteration has been started for n folders, which means that there are n nodes (corresponding to each of those folders) in current DFP path and the file name cache contains only direct items for those n folders (no more other items). When the DFS iteration for the (n+1)th folder has been started, it must be in one of the two following cases: a) None of the previous n DFS iterations has been completed. In this case, no item has been deleted from the file name cache, and only direct child items for the newly started folder have been added to the file name cache. It is straightforward to see that the loop invariant is maintained in this particular case, and b) one or more of the previous DFS iterations have been completed. Since the last operation for any folder iteration is a recycling operation, then one recycling operation will be carried out for each of those completed folders, which results into clearance of any direct child items belonging to those files folders from the file name cache. Then, the content of the file name cache will be the direct child items for the new (n+1)th folder and the remaining folders in the DFS path. In either case, the loop invariant is still maintained when the (n+1)th folder iteration begins.

(3) Termination. When the last folder involved in the backup is accessed, it is obviously the only one node left in the DFS path (more precisely, it should be the root folder). So the file name cache contains only the direct child items for this last folder at this stage. When the processing of this last folder has been completed, all items contained in this folder will be deleted from the file name cache, which clears the whole file name cache and leaves it empty. This demonstrates that the correctness of the file name cache is maintained after termination.

Figure 6:
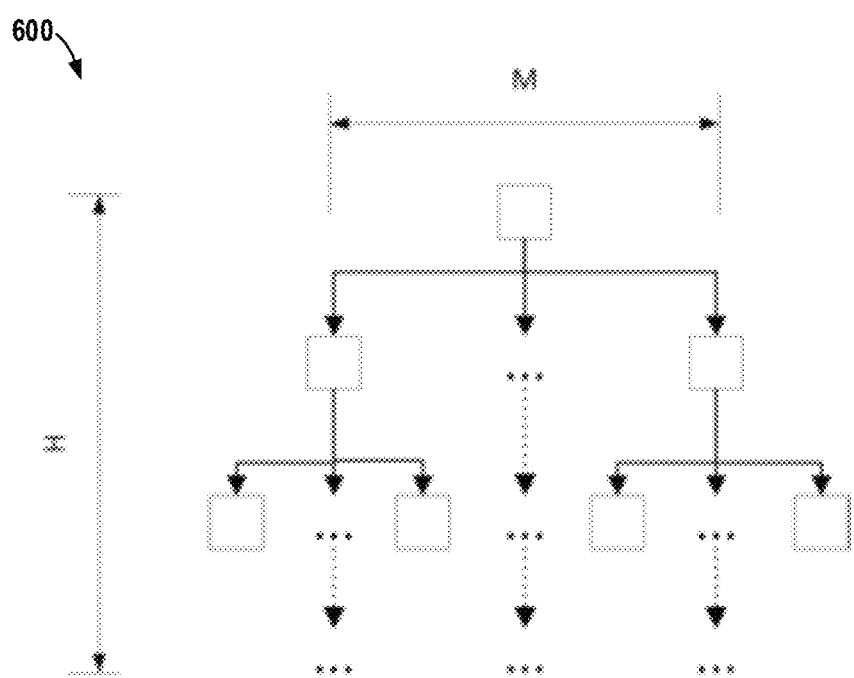
FIG. 6 illustrates a schematic diagram which illustrates complexity of the method in accordance with embodiments of the present disclosure.

The inventors also analyze the complexity of this solution. Pseudocode 2 relies on the post order DFS iteration to reduce the space complexity. FIG. 6 illustrates a schematic diagram 600 which illustrates complexity of the method in accordance with embodiments of the present disclosure. To simplify the discussion, the folder structure is assumed as the one illustrated by FIG. 6.

In this assumption, every folder (represented as an internal node) has exactly M direct sub-folders in it, except for the bottom layer folder (represented as a leaf node) which contains no sub-folders, and the maximum depth of the sub-folder is H. In essence, FIG. 6 gives a perfect tree of height H with a branching factor of M. To keep the illustration uncluttered, files are not represented in FIG. 6. It is easy to prove that the total folder count in FIG. 6 is $M^{H-1}$. If a further assumption is made that each folder contains exactly N file items, then the total number of file names required to be stored in set C of Pseudocode 1 is $NM^{H-1}$, which means that the space complexity of Pseudocode 1 is $O(NM^H)$. This basically says that the space requirement grows exponentially with the average folder depth H and polynomially (order H) with the average direct sub-folder count M. Although the folder depth H usually is not large, the direct folder count M or file count N may be huge in some real applications.

As a comparison, DFS always traverses the tree structure along a path from root to leaf, which means that the number of folders, which Pseudocode 2 has to maintain, will never exceed the maximum path length in the tree, namely the tree height H, since each processed folder is immediately deleted from the file name cache. Based on the above analysis, the space complexity of Pseudocode 2 can be written as $O(NH)$, which decreases drastically compared with the Pseudocode 1.

The perfect tree structure assumption can be relaxed to a general tree structure if this assumption is felt too strong. A similar comparison can still be carried out as follows. The space complexity of Pseudocode 1 still depends on the total number of folders regardless of their structure, while the space complexity of Pseudocode 2 depends on the maximum folder depth which now has no numerical relationship with the total folder number. In the worst case, when each folder contains exactly one direct sub-folder (i.e., the folder structure is now a pure linear structure instead of a tree, then the folder depth reaches its maximum), the space complexity of Pseudocode 2 degenerates to the same as Pseudocode 1. The worst case almost never happens in practice. Since the tree is not extremely unbalanced in practice, space complexity of a near best case can usually be expected.

The inventors also verify the performance of this method. A simulated data set (a single root file and folder hierarchy) is generated according to a folder structure described by FIG. 6, where branching factor M is set to 5, and depth H is set to 8. This configuration will generate nearly 100,000 folders. To better mimic a real world folder structure, the file count N per folder is no longer treated as a constant. It is sampled as a random variable following a normal distribution as $N \sim N(\mu, \sigma^2)$, where $\mu$ is the mean of the distribution while $\sigma$ corresponds to the standard deviation. For this particular simulation test, $\mu$ is set to 100 while $\sigma$ is set to 20, which means that approximately 68% of the file counts per folder lie in range [80, 120] and approximately 95% of them lie in range [60, 140]. It is noted that N is rounded to an integer after sampling, and reset to 0 if it becomes negative. This configuration will generate nearly 10,000,000 files in total. The reason that the branching factor M is not treated as a random variable is that doing so will introduce a variation too large to the total file count, making the test data set less reliable.

Another implementation detail is that all direct child items (folders and files) under a folder have been shuffled during the generation, which ensures that there is no specific order applied to folder items and file items at the same height of the tree structure. This operation is important to mimic a fact in real world application: the file names and folder names are random; and no assumption should be made to the relative order of the items within a single folder, especially the relative order between folder item and file item.

Figure 7:
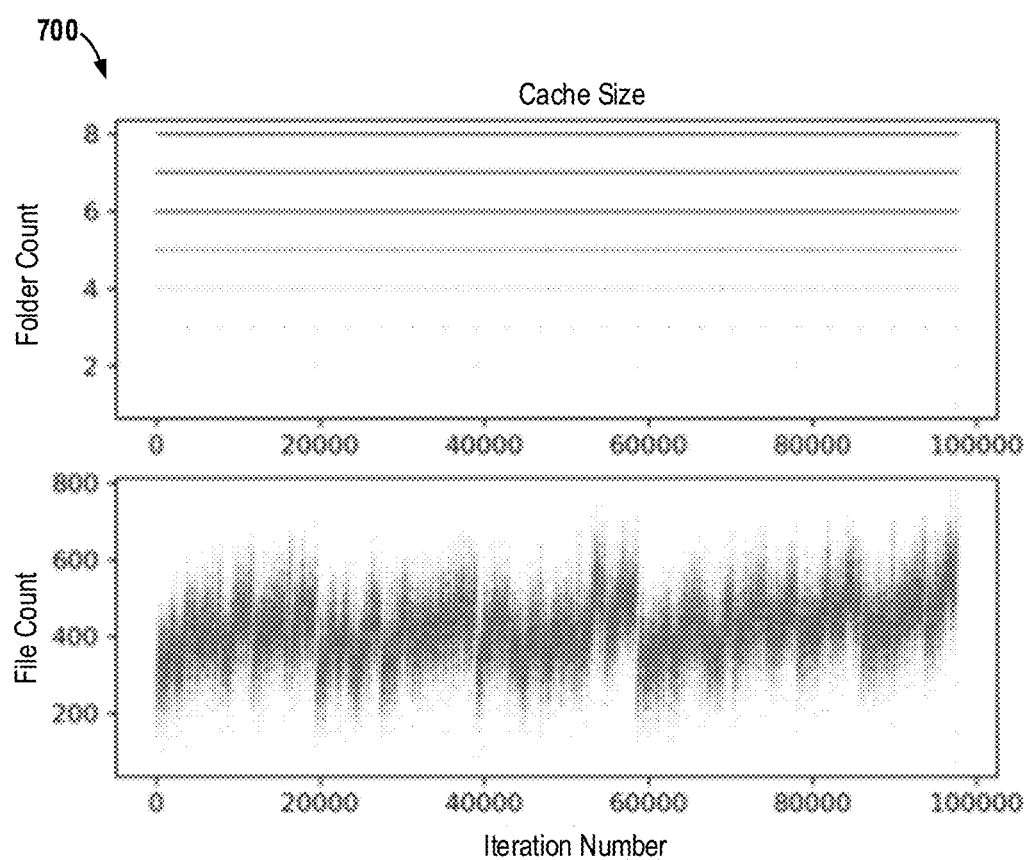
FIG. 7 illustrates a schematic diagram of performance simulation in the method according to embodiments of the present disclosure.

A simulated processing is carried out on the generated test data set. FIG. 7 illustrates a schematic diagram 700 of performance simulation in the method according to embodiments of the present disclosure, wherein the change of the file name cache during the iteration is recorded. The recording is performed as follows: each time when a folder item has been processed, the current cache size (for both layers) is recorded, meaning that the iteration count will be exactly the same as the total folder count.

The top half of FIG. 7 depicts the change (size of the first layer) of the folder count during the iteration. Since the maximum depth is limited to 8, the distribution of folder count is highly discrete. By definition, the folder count corresponds to the size of the first layer of the cache, which also reflects the current DFS depth of the tree iteration. It is observed that the folder count has a maximum value of 8 during the whole process, and keeps reaching its maximum for most of time, which demonstrates that the size of the first layer will never exceed the maximum DFS depth. This is a nice property in the aspect of performance: the first layer of the cache is always sparse irrelevant to folder count or file count, making the access and storage efficient. It is also noted that the chance for the first layer size to stay at n is reducing dramatically with the decrease of n: and a folder count below 4 can rarely be observed. This can be explained by the generated folder structure: since the folder structure of the test data is generated as a perfect tree, then the total nodes (folders) at each height (path length from root) form a geometric progression with common ratio M>0, which means more time will be spent on the nodes with a higher height (depth) during the iteration.

The bottom half of FIG. 7 illustrates the change of the total file count (size of the second layer) during the iteration. It is observed that the file count never exceeds 800 during the whole process. More precisely, the file count is far below 600 for most of the time, demonstrating the efficiency of the cache. Since the first layer size is negligible compared to the second layer size, the total size of the cache is dominated by this file count. It is summarized that a layered cache of size 800 is capable of handling backup data containing nearly 10,000,000 items, while the Pseudocode 1 approach requires loading all those items to into the cache.

It is proved by facts that this method can handle backup data containing 10,000,000 items with quite limited space consumption. The theoretical analysis and simulation results suggest that the space complexity of this method depends on the height of the tree structure instead of the total item count, which is suitable for management of larger backup data.

Figure 8:
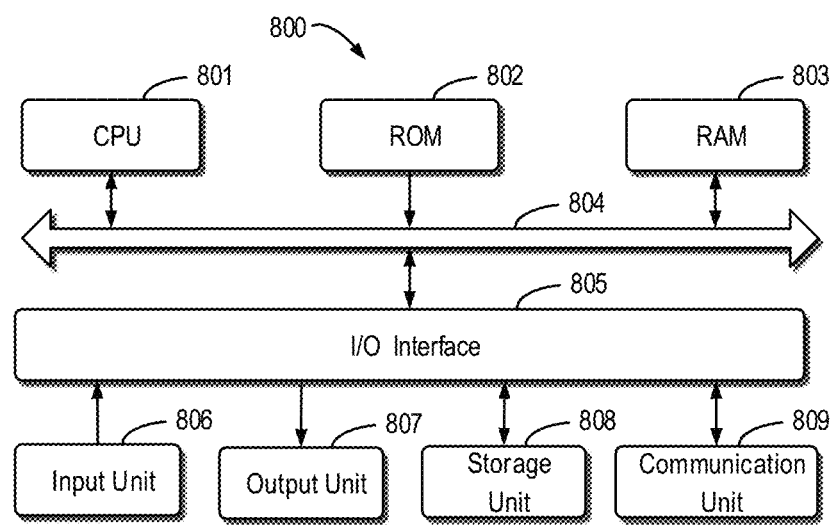
FIG. 8 illustrates a schematic block diagram of a device for implementing embodiments of the present disclosure.

FIG. 8 illustrates a schematic block diagram of an example computing device 800 for implementing embodiments of the present disclosure. The device 800 can perform the methods 400 and 500 with reference to FIGS. 4 and 5. As shown, the device 800 includes a central process unit (CPU) 801, which can execute various suitable actions and processing based on the computer program instructions stored in the read-only memory (ROM) 802 or computer program instructions loaded in the random-access memory (RAM) 803 from a storage unit 808. The RAM 803 can also store all kinds of programs and data required by the operations of the device 800. CPU 801, ROM 802 and RAM 803 are connected to each other via a bus 804. The input/output (I/O) interface 805 is also connected to the bus 804.

A plurality of components in the device 800 is connected to the I/O interface 805, including: an input unit 806, such as keyboard, mouse and the like; an output unit 807, e.g., various kinds of display and loudspeakers etc.; a storage unit 808, such as memory and optical disk etc.; and a communication unit 809, such as network card, modem, wireless transceiver and the like. The communication unit 809 allows the device 800 to exchange information/data with other devices via the computer network, such as Internet, and/or various telecommunication networks.

The processing unit 801 executes the above described each method and processing, such as methods 400 and 500. For example, in some embodiments, the methods 400 and 500 can be implemented as computer software program tangibly included in the machine-readable medium, e.g., storage unit 808. In some embodiments, the computer program can be partially or fully loaded and/or mounted to the device 800 via ROM 802 and/or communication unit 809. When the computer program is loaded to RAM 803 and executed by the CPU 801, one or more steps of the above described methods 400 and 500 can be implemented. Alternatively, in other embodiments, the CPU 801 can be configured via any other suitable ways (e.g., by means of firmware) to execute the methods 400 and 500.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a peer machine or entirely on the peer machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the shown particular order or in a sequential order, or all shown operations are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

We claim:

1. A method of file management, comprising:
    generating an index structure of files in existing backup data created at a first point of time, the index structure having a first layer and a second layer stored separately, wherein the first layer stores path information of each folder in the existing backup and the second layer stores file names of each of the folders, wherein for each path the first layer also associates each path information to the corresponding file names in the second layer;
    upon occurrence of an incremental backup, updating the index structure by for each item in the incremental backup performing:
    determining whether the item is a folder or a file;
    for an item determined to be a file, searching the first layer to check whether a file path of the file exists in the first layer and, if yes, adding the file name to the second layer and adding an association of the path in the first layer to the file name stored in the second layer, and when the file path does not exist in the first layer, adding to the first layer a new path and creating association to the second layer to the file name and storing the file name in the second layer;
    for an item determined to be a folder, obtaining from the incremental backup all filenames of files associated with the folder and identifying all filenames having corresponding entry in the second layer as modified files;
    repeating the determining, searching, and obtaining until all files and folders of the incremental backup have been processed.

2. The method of claim 1, wherein generating the index structure comprises:
    forming the first layer and second layer as to hash tables cascaded together.

3. The method of claim 1, wherein determining the existing files comprises:
    acquiring a first set of file names associated with the folder in the incremental backup data;
    acquiring a second set of file names associated with the folder in the existing backup data; and
    identifying, based on the first and second sets of file names, files having a same file name as the existing files.

4. The method of claim 3, further comprising:
    determining paths of files having the same file names of the existing files.

5. The method of claim 1, further comprising:
    in response to performing the identification of the modified files for all the existing files in the folder, deleting the index items of all the existing files from the index structure.

6. An electronic device, comprising:
    at least one processor;
    a memory coupled to the at least one processor and having instructions stored thereon, the instructions, when executed by the at least one processor, causing the at least one processor to perform operations, the operations comprising:
    generating an index structure of files in existing backup data created at a first point of time, the index structure having a first layer and a second layer stored separately, wherein the first layer stores path information of each folder in the existing backup and the second layer stores file names of each of the folders, wherein for each path the first layer also at least indicating file name and associateds each path information to the corresponding file names in the second layer;
    upon occurrence of an incremental backup, updating the index structure by for each item in the incremental backup performing:
    determining whether the item is a folder or a file;
    for an item determined to be a file, searching the first layer to check whether a file path of the file exists in the first layer and, if yes, adding the file name to the second layer and adding an association of the path in the first layer to the file name stored in the second layer, and when the file path does not exist in the first layer, adding to the first layer a new path and creating association to the second layer to the file name and storing the file name in the second layer;
    for an item determined to be a folder, obtaining from the incremental backup all filenames of files associated with the folder and identifying all filenames having corresponding entry in the second layer as modified files;

repeating the determining, searching, and obtaining until all files and folders of the incremental backup have been processed.

7. The device of claim 6, wherein the operations further comprise:
forming the first layer and second layer as to hash tables cascaded together.

8. The device of claim 6, wherein the operations further comprise:
acquiring a first set of file names associated with the folder in the incremental backup data;
acquiring a second set of file names associated with the folder in the existing backup data; and
identifying, based on the first set and second sets of file names, files having a same file name as the existing files.

9. The device of claim 8, wherein the operations further comprise:
determining paths of files having the same file names of the existing files.

10. The device of claim 6, wherein the operations further comprise:
in response to performing the identification of the modified files for all the existing files in the folder, deleting the index items of all the existing files from the index structure.

11. A non-transitory machine-readable medium having instructions stored therein, which when executed by a processor, cause the processor to perform operations, the operations comprising:
generating an index structure of files in existing backup data created at a first point of time, the index structure having a first layer and a second layer stored separately, wherein the first layer stores path information of each folder in the existing backup and the second layer stores file names of each of the folders, wherein for each path the first layer also at least indicating a file name and associatesd each path information to the corresponding file names in the second layer;
upon occurrence of an incremental backup, updating the index structure by for each item in the incremental backup performing:
determining whether the item is a folder or a file;
for an item determined to be a file, searching the first layer to check whether a file path of the file exists in the first layer and, if yes, adding the file name to the second layer and adding an association of the path in the first layer to the file name stored in the second layer, and when the file path does not exist in the first layer, adding to the first layer a new path and creating association to the second layer to the file name and storing the file name in the second layer;
for an item determined to be a folder, obtaining from the incremental backup all filenames of files associated with the folder and identifying all filenames having corresponding entry in the second layer as modified files;
repeating the determining, searching, and obtaining until all files and folders of the incremental backup have been processed.

12. The machine-readable medium of claim 11, wherein generating the index structure comprises:
forming the first layer and second layer as to hash tables cascaded together.

13. The machine-readable medium of claim 11, wherein determining the existing files comprises:
acquiring a first set of file names associated with the folder in the incremental backup data;
acquiring a second set of file names associated with the folder in the existing backup data; and
identifying, based on the first and second sets of file names, files having a same file name as the existing files.

14. The machine-readable medium of claim 13, wherein determining whether the index structure comprises the index items of the existing files further comprises:
determining paths of files having the same file names of the existing files.

15. The machine-readable medium of claim 11, wherein the operations further comprise:
in response to performing the identification of the modified files for all the existing files in the folder, deleting the index items of all the existing files from the index structure.

\* \* \* \* \*